United States Patent
Ike

(10) Patent No.: US 6,907,442 B2
(45) Date of Patent: Jun. 14, 2005

(54) DEVELOPMENT SYSTEM OF MICROPROCESSOR FOR APPLICATION PROGRAM INCLUDING INTEGER DIVISION OR INTEGER REMAINDER OPERATIONS

(75) Inventor: Atsushi Ike, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 630 days.

(21) Appl. No.: 10/098,151

(22) Filed: Mar. 15, 2002

(65) Prior Publication Data

US 2003/0046672 A1 Mar. 6, 2003

(30) Foreign Application Priority Data

Aug. 31, 2001 (JP) ........................................ 2001-263425

(51) Int. Cl.[7] .............................. G06F 7/52; G06F 7/72
(52) U.S. Cl. ...................................... 708/653; 708/491
(58) Field of Search ................................. 708/653, 491

(56) References Cited

U.S. PATENT DOCUMENTS

| | | | | |
|---|---|---|---|---|
| 5,696,713 A | * | 12/1997 | Kovacs | ........................ 708/653 |
| 5,754,460 A | * | 5/1998 | Tam | ............................. 708/653 |
| 6,470,372 B1 | * | 10/2002 | Monier | ........................ 708/650 |
| 6,836,784 B2 | * | 12/2004 | Perkins | ........................ 708/491 |

* cited by examiner

Primary Examiner—D. H. Malzahn
(74) Attorney, Agent, or Firm—Staas & Halsey LLP

(57) ABSTRACT

A microprocessor (10) comprises a compiler (4), which, for a source program including an integer division q=int(a÷b) (int( ) is a function discarding figures below decimal point in parentheses) for dividing integer a, expressed in N bits, by integer constant b, causes a computer to execute a first process for calculating mb=int(m÷b) (where m=$2^N$), and a second process for generating an object code, which stores the mb in a first register (24), calculates qx=int(a×mb÷m), calculates rx=a−qx×b, set a quotient q to q=qx when rx<b, or q=qx+1 when rx>=b;

and a microprocessor having an arithmetic circuit (11), which comprises the first register, a multiplier (14), and an adder-subtractor (16), and which executes the object code generated by the compiler.

28 Claims, 12 Drawing Sheets

FIG. 1

DIVISION USING RESTORING METHOD

```
              0 0 1 1 1 0
       ┌─────────────────
  1 1 ) 1 0 1 0 1 1
        0
        ─────
          1 0  . . . . . . . . . S1
          0
          ─────
          1 0 1  . . . . . . . . S2
            1 1
          ─────
            1 0 0  . . . . . . . S3
              1 1
            ─────
              0 1 1  . . . . . . S4
                1 1
              ─────
                0 1  . . . . . . S5
                0 0
                ─────
                  1  . . . S6
                    REMINDER
```

FIG. 11

DIVISION IN CASE OF b<0

```
; START DIVISION (r1 = a, r2 = -b, mb=int(2^32/b))
  subcc   0,r1,r8,icc                              ; c2
  ble     L1               ;-r1 -> r8 (SET icc)    ; c20
                           ;(r1≧0)? BLANCH TO L1   ; c21 mul     r8,mb,r4         ;r8 × mb -> r4&r5       ; c3  ⎫
  mul     r4,r2,r6         ;r4 × r2 -> r6&r7       ; c4  ⎪
  sub     r8,r7,r3         ;r8 - r7 -> r3          ; c5  ⎬ 40   a<0,b<0
  subcc   r2,r3,icc        ;r2 - r3 -> icc         ; c6  ⎪      (r1<0,r2>0)
  bgt     end                                      ; c7  ⎪
  addi    r4,#1,r4         ;r4+1 -> r4             ; c8  ⎭ bra     end
L1:
  mul     r1,mb,r4         ;r1 × mb -> r4&r5       ; c23 ⎫
  mul     r4,r2,r6         ;r4 × r2 -> r6&r7       ; c3  ⎪
  sub     r1,r7,r3         ;r1 - r7 -> r3          ; c4  ⎬ 42   a>0,b<0
  subcc   r2,r3,icc        ;r2 - r3 -> icc         ; c5  ⎪      (r1>0,r2>0)
  bgt     end                                      ; c6  ⎪
  addi    r4,#1,r4         ;r4+1 -> r4             ; c7  ⎭
                                                   ; c8 sub     0,r4,r4          ;-r4 -> r4              ; c24
end:
;END SIGNED INTEGER DIVISION (r4=DIVISION RESULT)  ; c25
```

DEVELOPMENT SYSTEM OF MICROPROCESSOR FOR APPLICATION PROGRAM INCLUDING INTEGER DIVISION OR INTEGER REMAINDER OPERATIONS

BACKGROUND OF THE INVENTION

1. Field of the Invention

The present invention is related to a development system of a microprocessor for an application program including integer division or integer remainder operations, and more particularly, to a development system having a compiler, which is capable of greatly reducing the number of operating cycles required for integer division or an integer remainder operation of a microprocessor.

2. Description of the Related Art

For a microprocessor, division and remainder operations accompanying division among the four arithmetic operations require the most operating cycles. For example, in the case of a 32-bit unsigned operation, whereas addition and subtraction can be executed in one cycle, and multiplication can be executed in two cycles on an ordinary processor, division requires anywhere between 18–34 cycles.

The reason division is slow is because it cannot be achieved with a divider-oriented algorithm in a short operating cycle, and in most cases employs the same restoring method used for written calculations. The restoring method of a written calculation requires a number of machine cycles equivalent to the number of bits of the dividend.

FIG. 1 is a diagram showing an example of division using the restoring method. When 6-bit dividend "001110" is divided by 2-bit divisor "11," division is completed by attempting to subtract the divisor "11" from the dividend, with "1" being assigned when subtraction is possible, and "0" being assigned when subtraction is not possible, and this operating cycle being repeated a number of times equivalent to the number of digits in the dividend. That is, a 6-bit dividend operation can be completed in a total of six cycles, the cycles S1–S6 in FIG. 1. With this method, when a dividend is 32 bits, division simply requires 32 cycles.

In another division example, there is a method, whereby the number of bits capable of being processed in one cycle can be increased to two bits or three bits instead of one bit. In this case, in order to process two bits at a time relative to the dividend, a determination is made as to whether or not divisor "11"×1, divisor "11"×2, and divisor "11"×3 can be subtracted from the dividend, and the respective answers are given as "01", "10" and "11". Therefore, the hardware constitution of the divider becomes more complex, and increased power consumption is incurred in line therewith.

As another division example, there is also a method, whereby division is performed via the above-mentioned restoring method by checking to determine the presence of "0" in the high bits of the dividend and beginning when "1" is initially detected. A read-zero method like this requires hardware that checks the high bits for "0", and, in addition, gives rise to the problem that the execute cycle differs according to the dividend, making it difficult to manage a division operation schedule.

In an application program, it is well known that wasteful division is eliminated by creating a program code that replaces a division operation with the multiplication of a dividend by the reciprocal number of a divisor. Therefore, a compiler, which analyzes an application program and converts it to an assembly code (code corresponding to an object code), can be considered for replacing a division operation inside an application program with the multiplication of the dividend by the reciprocal of the divisor in accordance with this method.

However, since a compiler cannot know how a programer that describes an application program determines the significant digit of a division operation, this kind of replacement cannot be said to be very desirable.

In addition to the above, it is not really desirable to make the constitution of a divider more complex in line with increasing the frequency of a microprocessor. This is because the period of one cycle becomes shorter pursuant to increasing the frequency, making it difficult for a divider of a complex constitution to finish this operation within a cycle.

SUMMARY OF THE INVENTION

Accordingly, an object of the present invention is to provide a system having a compiler, which is capable of greatly reducing the number of operating cycles required for an integer division or an integer remainder operation of a microprocessor.

Another object of the present invention is to provide a compiler, which is capable of greatly reducing the number of operating cycles required for an integer division or an integer remainder operation of a microprocessor.

Another object of the present invention is to provide a microprocessor having an assembly code, which greatly reduces the number of operating cycles required for an integer division or an integer remainder operation of a microprocessor.

Furthermore, another object of the present invention is to provide a microprocessor system having an assembly code, which greatly reduces the number of operating cycles required for an integer division or an integer remainder operation of a microprocessor.

To realize the above-mentioned objects, a first aspect of the present invention is a system, comprising a compiler, which, for a source program including an integer division $q=\text{int}(a \div b)$ (int( ) being a function which discards figures below decimal point in parentheses) for dividing integer a, which is expressed in N bits, by integer constant b, causes a computer to execute a first process for calculating $mb=\text{int}(m \div b)$ (where $m=2^N$), and a second process for generating an object code, which stores the mb in a first register, calculates $qx=\text{int}(a \times mb \div m)$, calculates $rx=a-qx \times b$, set a quotient q to $q=qx$ when $rx<b$, and set the quotient q to $q=qx+1$ when $rx>=b$; and a microprocessor having an arithmetic circuit, which comprises the above-mentioned first register, a multiplier, and an adder-subtractor, and which executes the object code generated by the compiler.

According to the above invention, a compiler for converting a source code to an object code, such as, a processor-executable assembly code or other, for integer division $q=\text{int}(a \div b)$, calculates $mb=\text{int}(m \div b)$ (where $m=2^N$) and embeds an object code for storing this constant mb in a prescribed register, and, in addition, generates an object code, which calculates $qx=\text{int}(a \times mb \div m)$, calculates $rx=a-qx \times b$, sets the quotient q to $q=qx$ when $rx<b$, and sets the quotient q to $q=qx+1$ when $rx>=b$.

Therefore, an object code for integer division $q=\text{int}(a \div b)$ converted by a compiler comprises only store-to-register, multiply, subtract, N-bit shift ($\div m$), compare and branch. When the processor executes this object code, because there are no ordinary division steps, integer division $q=\text{int}(a \div b)$ can be processed using a greatly reduced operating cycle.

To achieve the above objects, a second aspect of the present invention is a system, comprising a compiler, which, for a source program including an integer remainder calculation q=int(a mod b)(int( ) being a function which discards figures below decimal point in parentheses) for determining a reminder when integer a, which is expressed in N bits, is divided by integer constant b, causes a computer to execute a first process for calculating mb=int(m÷b) (where m=$2^N$), and a second process for generating an object code, which stores the mb in a first register, calculates on qx=int(a× mb÷m), calculates rx=a−qx×b, sets the remainder r to r=rx when rx<b, and sets the remainder r to r=rx−b when rx>=b; and a microprocessor having an arithmetic circuit, which comprises the above-mentioned first register, a multiplier, and an adder-subtractor, and which executes an object code generated by this compiler.

According to the above invention, a compiler for converting a source code to an object code, such as, processor-executable assembly code or other, for integer remainder operation q=int(a mod b), calculates mb=int(m÷b) (where m=$2^N$) embeds an object code for storing this constant mb in a prescribed register, and, in addition, generates an object code, which calculates qx=int(a×mb÷m), calculates rx=a−qx×b, sets the remainder r to r=rx when rx<b, and sets the remainder r to r=rx−b when rx>=b.

Therefore, an object code for integer remainder calculation q=int(a mod b) converted by the compiler comprises only store-to-register, multiply, subtract, N-bit shift (÷m), compare and branch. When the processor executes this object code, because there are no ordinary division steps, integer remainder calculation q=int(a mod b) can be processed using a greatly reduced operating cycle.

In a more preferred embodiment for the above-described first and second aspects, when the product of a×mb is stored in a higher rank register and lower rank register by double precision (when a, mb are N bits, the product is 2N bits), making the value of this high rank register qx=int(a×mb÷m) enables the elimination of the operating cycle for the above-mentioned N-bit shift operation (÷m).

In a more preferred embodiment for the above-described first and second aspects, the compiler can similarly convert a source program to an object code without using a divider even when integers a and b are signed integers. That is, when both a and b are negative, the above-mentioned object code can be generated by converting the signs of both a and b to positive, and when either a or b is negative, the above operation can be performed by converting the negative sign to positive, and generating an object code, which adds a negative sign to the operation results thereafter. However, this requires an object code which determines the sign bit of integer a. Furthermore, if integer b is a constant, the compiler can ascertain the sign thereof, and can generate an object code corresponding to the sign of the divisor b.

The inventions of the above-described first and second aspects can be utilized as microprocessor development systems. At the microprocessor development stage, a development system, having an evaluation microprocessor, a command code memory for supplying an object code, which is command code, thereto, and a compiler for converting a source program to an object code, converts a developed source program to an object code, executes the evaluation microprocessor, and evaluates whether or not a desired function is achieved. An object code, which has been converted by this compiler, can execute integer division or an integer remainder operation via a short operating cycle.

The inventions of the above-described first and second aspects can also be used as a system having an ordinary microprocessor. According to this system, a compiler can convert a source program to an object code capable of executing integer division or an integer remainder operation inside the source program in a short operating cycle, and can greatly reduce microprocessor execution time.

BRIEF DESCRIPTION OF THE DRAWINGS

FIG. 1 is a diagram showing an example of division using a conventional restoring method;

FIG. 11 shows an example of an assembly code by which a signed integer division of divisor b<0 is converted by a compiler of an aspect of the embodiment.

DESCRIPTION OF THE PREFERRED EMBODIMENTS

Aspects of the embodiment of the present invention will be explained hereinbelow by referring to the figures. However, the scope of protection of the present invention is not limited to the following aspects of the embodiment, but rather extends to the inventions described in the claims and the equivalents thereof.

Figure 2:
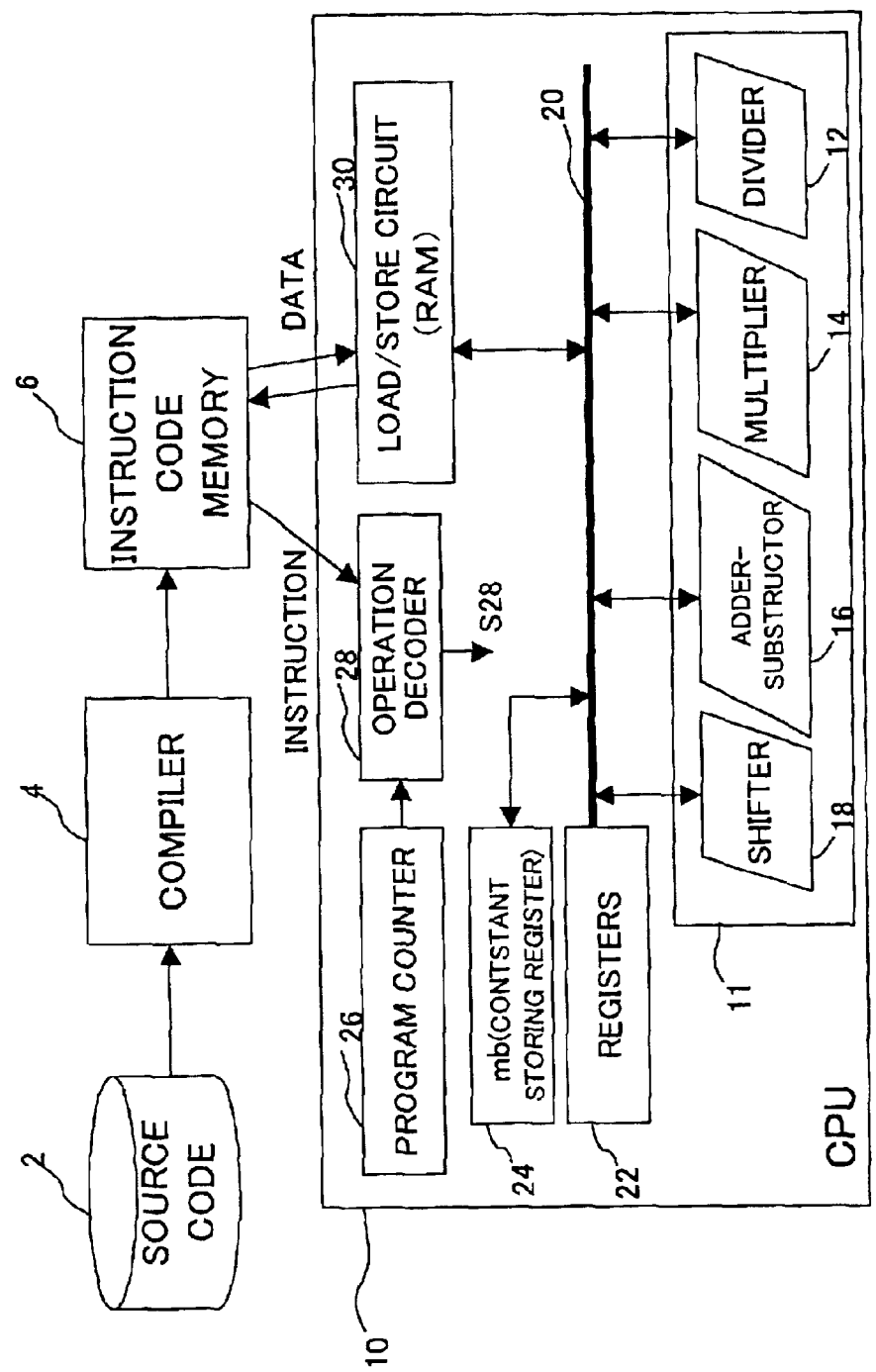
FIG. 2 is an overall block diagram of a microprocessor development system of an aspect of the embodiment.

FIG. 2 is an overall block diagram of a system having a microprocessor of an aspect of the embodiment. At the microprocessor development stage, an object code, such as assembly code, which is stored in external memory 6, is executed by an evaluation microprocessor 10, and an evaluation is performed to determine if a desired function can be achieved. This evaluation microprocessor has the same function circuits as a production microprocessor, and the evaluation circuit required for evaluation, and executes an object code produced by converting a source program 2 that is being developed, by a compiler 4.

The evaluation microprocessor 10 in FIG. 2 has an arithmetic unit 11, general-purpose registers 22 and a load/store circuit 30 for temporarily storing data, which are connected via an internal bus 20, and, in addition, it also has a program counter 26 and an operation decoder 28 for decoding loaded instruction code, and generating a control signal S28 corresponding to an instruction.

Evaluation microprocessor 10 shown in FIG. 2 also describes a substantially equivalent production microprocessor. There might be production microprocessors in which memory 6, which stores an object code (instruction code) in evaluation microprocessor 10, is built in. In either case, the arithmetic unit 11 of evaluation microprocessor 10 is the same constitution as the arithmetic unit of a production microprocessor. And the arithmetic unit 11 thereof has, for example, a multiplier 14, adder-subtractor 16, shifter 18 and divider 12.

Microprocessor 10 of this aspect of the embodiment is characterized in that a mb register 24 for storing an integer constant mb, which will be described hereinbelow, is provided. This mb register 24 is a register in which an mb value, which is determined beforehand by the compiler, is loaded pursuant to executing an object code when performing an integer division or integer remainder operation. Therefore, mb register 24 can be provided in a fixed condition at a predetermined address in hardware, or a specific register within the general-purpose registers 22 can be assigned to the mb register. Furthermore, an mb register can also be assigned inside memory 30. And there are also cases in which the number of mb registers is plural. As will be explained hereinbelow, in this aspect of the embodiment, the fact that the compiler 4 determines this integer constant mb beforehand and stores it in mb register 24 means that integer division and an integer remainder operation can be performed in an execute cycle that is shorter than when a general division instruction is executed and a divider takes a long execute cycle to perform division.

The system of this aspect of the embodiment, in addition to evaluation microprocessor 10, has a source program file 2 that is being developed, a compiler (a kind of program) 4 for interpreting this source program and converting it to a microprocessor-executable assembly code, and instruction code memory 6 for storing the assembly code (object code) converted by compiler 4. Instruction code memory 6 is connected to operation decoder 28 such that assembly code is read out from operation decoder 28 inside microprocessor 10. Here in this specification, assembly code refers to microprocessor-executable program code, and is substantially the same as object code. Therefore, in this specification, assembly code converted by compiler 4 and stored in instruction code memory 6 is also often referred to as object code.

At the microprocessor development stage, a source program 2 written by a high-level language such as the C language, and being executed by a microprocessor, is developed. A source code 2, which is being developed, is converted to assembly code by compiler 4 and is stored in instruction code memory 6. Then, evaluation microprocessor 10 executes the assembly code stored in instruction code memory 6, and an evaluation is performed as to whether or not a desired function is achieved.

Then, when source program development is complete, the assembly code (that is, object code), which compiler 4 converted, is written into either the internal ROM or the external ROM of a production microprocessor, and a microprocessor system, having either a ROM-embedded production microprocessor or external ROM, is produced.

Further, the system of this aspect of the embodiment can be utilized not only as a microprocessor development system, but also as a system having an ordinary microprocessor. In this case, compiler 4 converts a source program 2, which is an application, to assembly code, and this assembly code is executed by microprocessor 10.

(Integer Division)

Now then, in this aspect of the embodiment, compiler 4 converts an unsigned integer division q=int(a÷b) (wherein int( ) is a function which omits the figures below decimal point in parentheses) for dividing unsigned integer a, which is expressed in N bits, by unsigned integer b, into assembly code, which does not include division instructions by a divider. Therefore, since unsigned integer division instructions inside the source program are converted into assembly code comprising a sequence of code that does not include division instructions, when microprocessor 10 executes this assembly code, unsigned integer division instructions can be executed via a small number of operating cycles.

The specific principle is as follows. It is assumed that unsigned integer division q=int(a÷b), which divides unsigned integer a, which is expressed in N bits, by unsigned integer b, is computed. If integer b is a constant, the mb value is treated as $$mb=\text{int}(m \div b)$$

by using $m=2^N$, and when $$qx=\text{int}(a \times mb \div m)$$

is introduced, the quotient q being sought becomes $$q=qx \text{ (when } a/b-qx<1, \text{ that is, } a-qx \times b<b) \tag{1}$$

$$q=qx+1 \text{ (when } a/b-qx \geq 1, \text{ that is, } a-qx \times b>=b) \tag{2}$$

In other words, quotient q is either equivalent to qx, or equivalent to qx+1, where a correction of +1 is added to qx.

The reason there are case where quotient q is equivalent to qx, and case where it is equivalent to qx+1 is as follows. All digits of quotient q after a radix point in integer a/b are omitted by function int. Consequently, the following relation is established.

$$0=<a/b-q<1 \tag{3}$$

Furthermore, for the qx value, there is an error of less than 1 in mb=int(m÷b), and in accordance with $$qx=\text{int}((a/m) \times mb)$$

this error of less than 1 becomes an a/m times error relative to qx. Furthermore, since there is an error of less than 1 resulting from the function int for qx, in the end, the following relationship is formed.

$$0=<a/b-qx<1+a/m<2 \tag{4}$$

Accordingly, the error q−qx between quotient q and value qx is $$q-qx=(a/b-qx)-(a/b-q)$$

And by substituting the above (3) and (4) in this formula, it becomes $$-1<q-qx<1+a/m<2 \text{ (where } a/m<1)$$

That is, because q and qx are both integers, q−qx becomes either 0 or 1, and therefore quotient q is either equivalent to value qx, or equivalent to qx+1.

In conclusion, $$\text{when } a/b-qx<1, \text{ that is, } a-qx \times b<b, \ q=qx \tag{1}$$

$$\text{when } a/b-qx>=1, \text{ that is, } a-qx \times b>=b, \ q=qx+1 \tag{2}$$

Accordingly, when compiler 4 detects integer division q=int(a÷b) inside source program 2, compiler 4 calculates on mb=int(m÷b), generates assembly code for setting the determined mb value in the mb register, and compiler 4 also generates assembly code for calculating qx=int(a×mb÷m), assembly code for calculating (rx=a−qx×b), and assembly code for comparing (rx=a−qx×b) against b and determining division quotient q according to (1) and (2) above.

With the exception of (÷m), division instructions are not included in assembly code generated like this, and the division instruction can be executed using only multiply, add and subtract. And since (÷m) is $\frac{1}{2}^N$, these computations can be executed using shift instructions instead of division instructions. Furthermore, these shift instructions can also be omitted by employing the value of the high bit register in which the result of executing multiplication instruction (a×mb) is stored.

Figure 3:
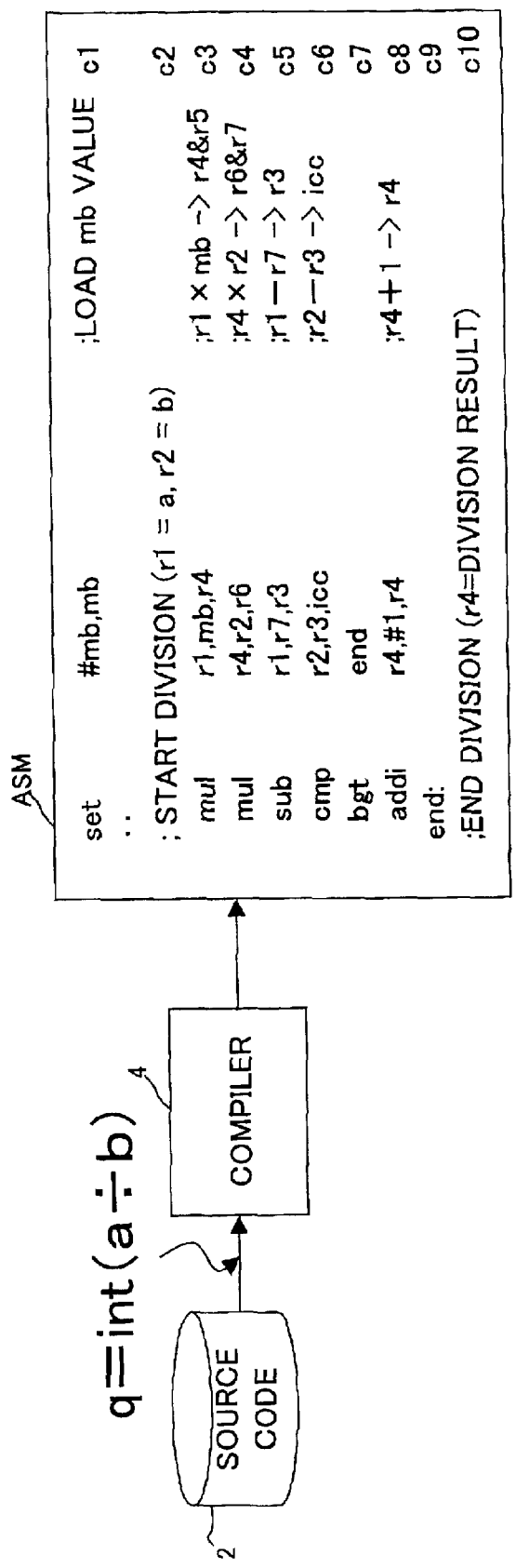
FIG. 3 is a diagram showing an example of a compiled integer division of an aspect of the embodiment.

FIG. 3 is a diagram showing an example of a compiled integer division of an aspect of the embodiment. In accordance with the principle described hereinabove, when compiler 4 detects integer division q=int(a÷b) inside source program 2, it calculates the mb value, and, in addition, generates the assembly code ASM shown in the figure.

Assembly code ASM shown here, if explained in the order given, has a code (set) for storing an mb value (#mb) in the mb register, a multiplication code (mul), a subtraction code (sub), a comparison code (cmp), a bigger-than code (bgt), an addition code (addi) and a label (end). The r1–r7 inside the assembly code indicate general-purpose registers, mb indicates the mb register, and characters following a semicolon ";" comprise a comment. An explanation of this assembly code will be given hereinbelow.

Figure 4:
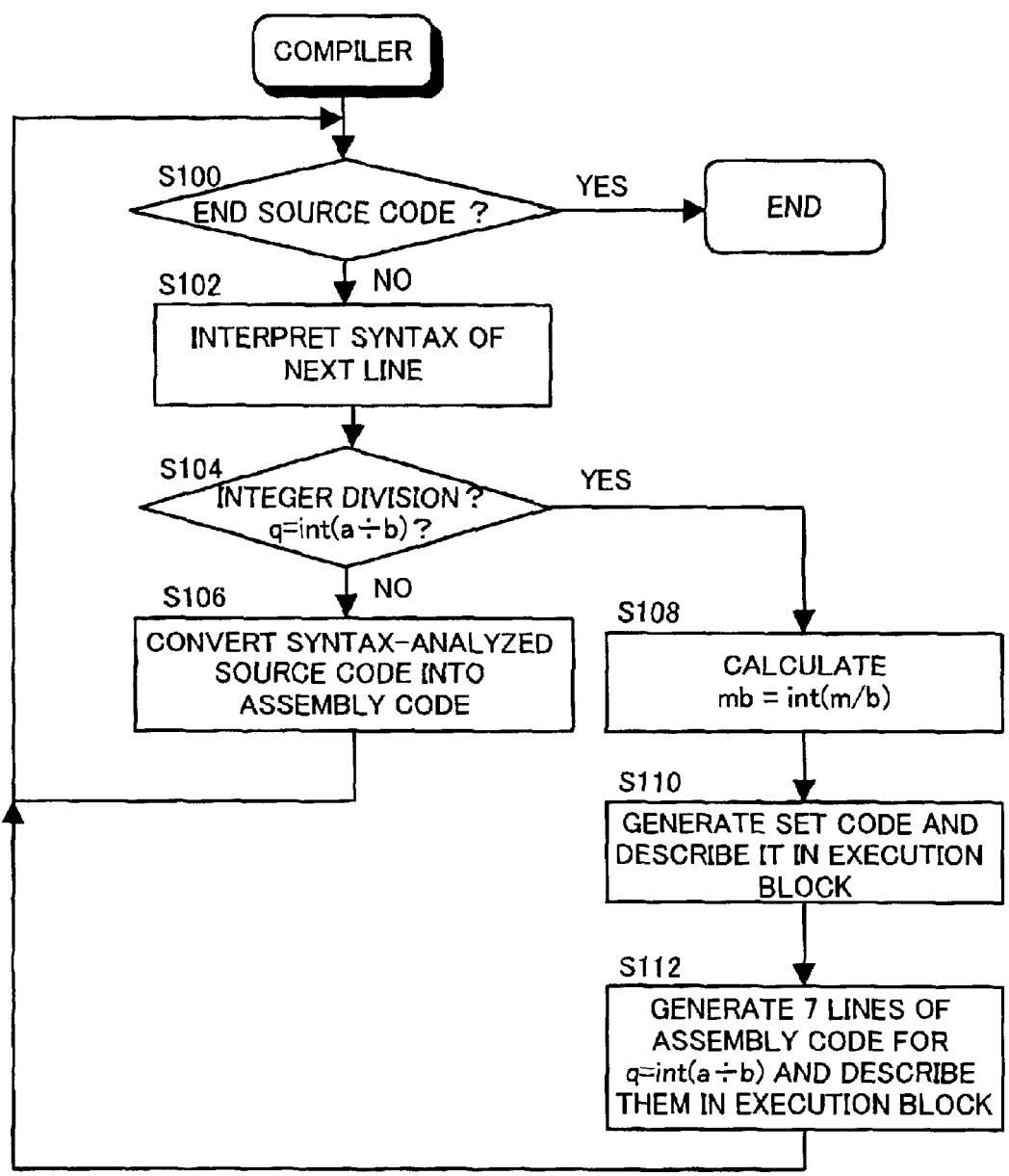
FIG. 4 is a flowchart of a compiler of an aspect of the embodiment.

FIG. 4 is a flowchart of a compiler of this aspect of the embodiment. Compiler 4 interprets the syntax of a source code, and converts the source code to a microprocessor-executable assembly code. As illustrated by FIG. 4, source code syntax is analyzed (S102) until the source code ends (S100). And syntax-analyzed source code is repeatedly converted to assembly code (S106) until integer division is detected (S104).

When the compiler detects q=int(a÷b) (b is a constant), which is an integer division inside the source code, it calculates mb=int(m/b)(m=$2^N$) (S108), and also generates set code (set) for storing the mb value determined via the above calculation in the mb register, and describes this set code in the execution block (S110). This set code corresponds to code c1 in FIG. 3. The compiler also generates seven lines of assembly code (code c3–c9 in FIG. 3) for integer division q=int(a÷b), and describes this assembly code in the execution block (S112).

Figure 5:
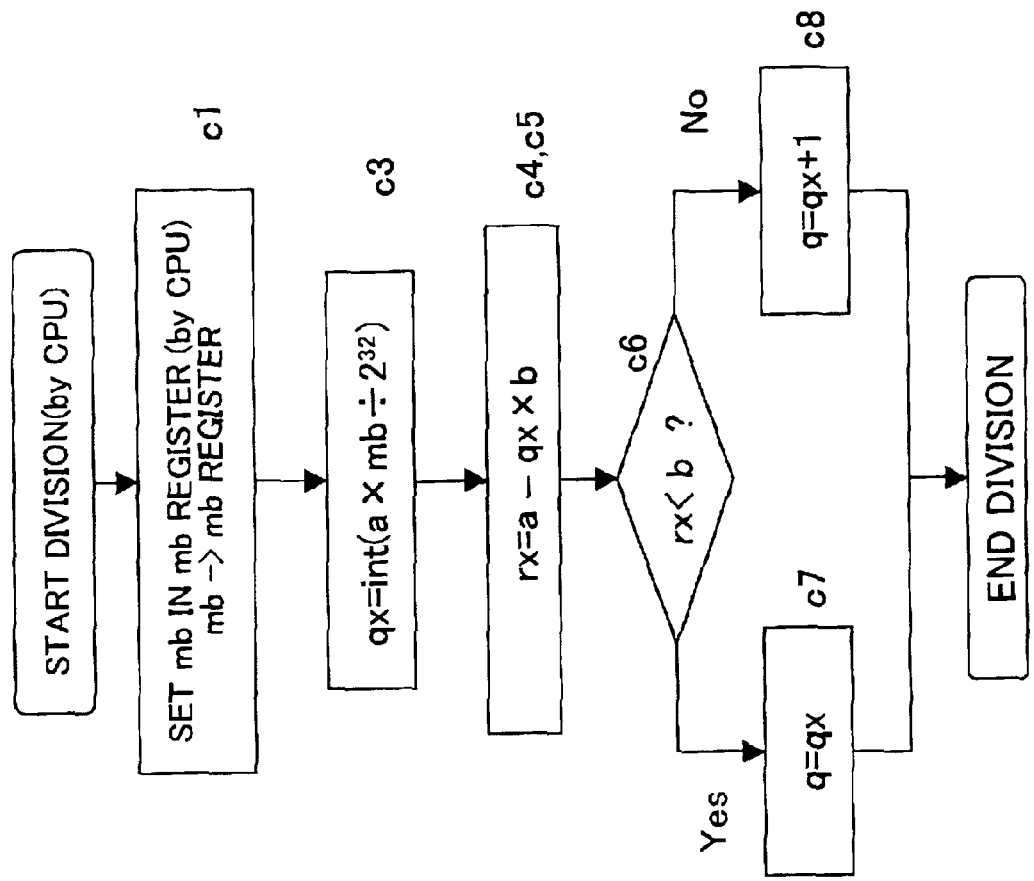
FIG. 5 is a flowchart of assembly code ASM shown in FIG. 3.

FIG. 5 is a flowchart of assembly code ASM shown in FIG. 3. The functions of the various codes will be explained in line with the assembly code of FIG. 3. Code c1 is an instruction code for the compiler to store the mb value #mb determined during compiling in the mb register. When there is a plurality of integer divisions inside a source program, this code c1 must either set up mb registers corresponding to each integer division, or be embedded in front of the respective integer division assembly codes.

Next, assembly code ASM has seven lines of code c3–c9 corresponding to an integer division. Execution of integer division is premised on storing integer a in general-purpose register r1, and storing integer b in general-purpose register r2, respectively. Code c3 is an instruction code for multiplying the dividend a of register r1 by the constant #mb of register mb, and storing this result in general-purpose register r4. When dividend a of register r1 is 32 bits, and constant #mb of register mb is 32 bits, 64 bits is required for the product thereof. Therefore, the result obtained by executing this instruction code c3, the product (a×mb), is divided into high bits and low bits and stored in two registers, general-purpose registers r4 and r5. That is, a 64-bit product (a×mb) is stored in higher rank register r4 and lower rank register r5.

The next code c4 is an instruction code for storing product (qx×b) of qx of general-purpose register r4 and b of general-purpose register r2 in general-purpose register r6. In this case, the high bits of qx determined by code c3 are stored in general-purpose register r4, and the low bits of qx are stored in general-purpose register r5, respectively, and by using the high bits of general-purpose register r4 as qx, it is possible to omit the 32-bit shift operation of (÷$2^{32}$).

Then, the next code c5 is a subtraction instruction code for storing the value rx obtained by subtracting (qx×b) of general-purpose register r7 from a of general-purpose register r1, in general-purpose register r3. The next code c6 is an instruction code for comparing b of general-purpose register r2 and rx=a−qx×b of general-purpose register r3, and simultaneously setting rx−(a−qx×b) in an integer condition code ICC, code c 7 is a code for determining whether or not b is bigger than (bigger than: bgt) rx. If the decision is Yes, processing jumps to label end, and if the decision is No, the next code c8 is executed. Code c8 is an addition instruction code for adding integer "1" to qx of general-purpose register r4, and storing same in general-purpose register r4.

As a result of executing the above assembly code, integer division quotient q (=qx or qx+1) is stored in general-purpose register r4. Thus, it is clear that a division instruction code (div) does not exist inside the assembly code ASM. Ordinarily, since multiplication instruction mul is two cycles, and subtraction instruction sub, comparison instruction cmp, branch instruction bgt, and addition instruction addi are one cycle each, the operating cycles of the microprocessor for assembly codes c3 through c9 of FIG. 3 constitute a total of eight cycles. When the high bits and low bits are not divided as in registers r4, r5, the operating cycles total nine cycles even when a 32-bit shift instruction is added.

Therefore, the number of operating cycles can be reduced much more than that of a conventional division instruction, which requires 32 cycles to carry out a 32-bit integer division by a restoring operation of 1-bit units.

Figure 6:
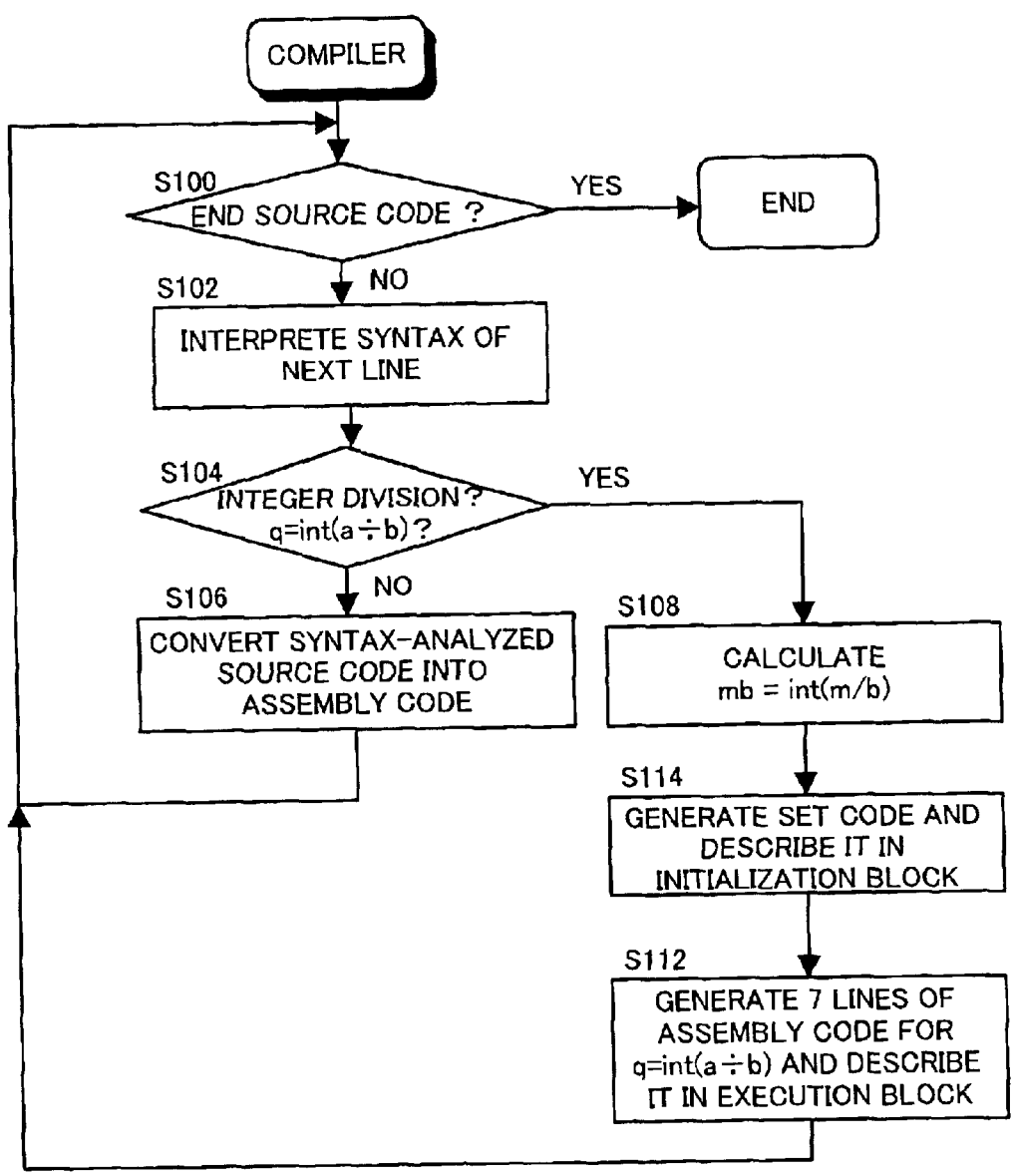
FIG. 6 is another flowchart of a compiler of an aspect of the embodiment.
Figure 7:
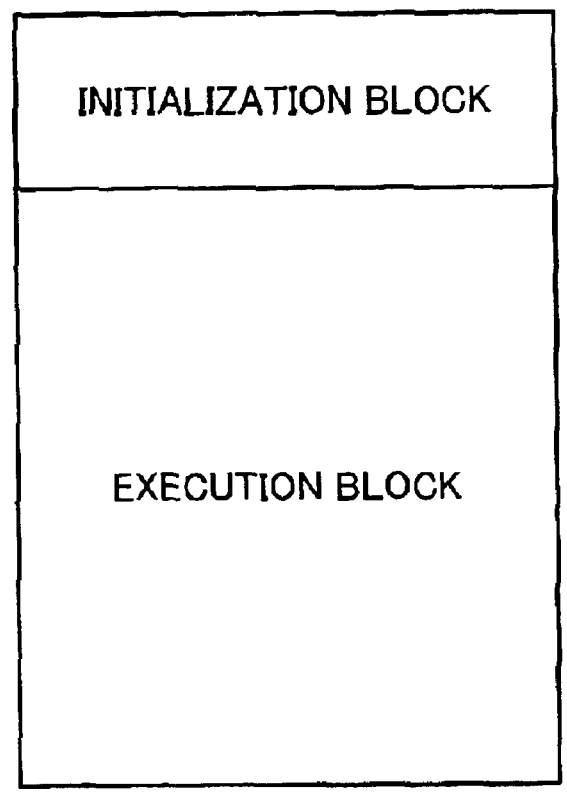
FIG. 7 is a diagram showing a C language initialization block and execution block.

FIG. 6 is another flowchart of a compiler of this aspect of the embodiment. When the compiler shown in FIG. 4 detects an integer division inside a source code, it describes a set code for calculating an mb value and storing this value in register mb in the execution block of the C language. FIG. 7 constitutes a C-language execution block and an initialization block. Global variables are defined in the initialization block, and instruction code is executed by the execution block.

The compiler of FIG. 6 is valid only when integer divisions, which divide by the same integer b, exist inside a source code, and only the describing of a generated set code in the initialization block in Step S114 differs from Step S110 of FIG. 4. Other than that, FIG. 6 is the same as FIG. 4.

Therefore, with the assembly code converted by the compiler of FIG. 6, since instruction code c1 is executed inside the initialization block, it is not necessary to execute instruction code c1 for every other division operation in the execution block. This makes it possible to reduce the number of execute cycles of the microprocessor by that amount.

Integer Remainder Operation

In this aspect of the embodiment, compiler 4 converts unsigned integer remainder operation r=int(a mod b)(int( )

being a function which omits the figures below decimal point in parentheses) for determining a remainder when unsigned integer a, which is expressed in N bits, is divided by unsigned integer constant b, to assembly code that does not comprise division instructions by a divider. Therefore, since the unsigned integer remainder instructions inside a source program are converted to assembly code comprising a sequence of code that does not include division instructions, when microprocessor 10 executes this assembly code, the unsigned integer remainder instructions can be executed using a small number of operating cycles.

The specific principle is as follows. When computing unsigned integer remainder operation r=int(a mod b), which determines the remainder when unsigned integer a expressed in N bits is divided by unsigned integer b, if integer b is a constant, the mb value is treated as $$mb=\text{int}(m \div b)$$

by using $m=2^N$, and when $$q=\text{int}(a \div b)$$

$$qx=\text{int}(a \times mb \div m)$$

are introduced, the sought-after remainder r becomes $$r=a-q \times b \quad (5)$$

And then, because the divisor q has a relationship with qx such as is indicated by formulas (1) and (2), by substituting formulas (1) and (2) for formula (5), remainder r becomes $$r=a-qx \times b \text{ (when } a-qx \times b < b) \quad (6)$$

$$r = a - (qx+1) \times b \quad (7)$$

$$= a - qx \times b - b \text{ (when } a - qx \times b >= b)$$

Therefore, if it is supposed that $rx=a-qx \times b$, the remainder r then becomes $$r=rx \text{ (when } rx<b) \quad (8)$$

$$r=rx-b \text{ (when } rx>=b) \quad (9)$$

Accordingly, when compiler 4 detects integer remainder operation r=int(a mod b) inside a source code, the compiler calculates mb=int(m÷b) (where $m=2^N$), and embeds an object code for storing the constant mb thereof in a prescribed register, and the compiler also generates an object code for calculating qx=int(a×mb÷m), calculating rx=a−qx× b, setting the remainder r to r=rx when rx<b, r=rx−b when rx>=b.

Other than (÷m), since there is only multiplication and division inside the above-described object code, a microprocessor can perform an integer remainder operation without multiplication instructions.

A flowchart for the compiler for converting a remainder calculation will be the same as FIG. 4 or FIG. 6, the only difference being that assembly code for remainder calculation r=int(a mod b) is generated in Step S112.

Figure 8:
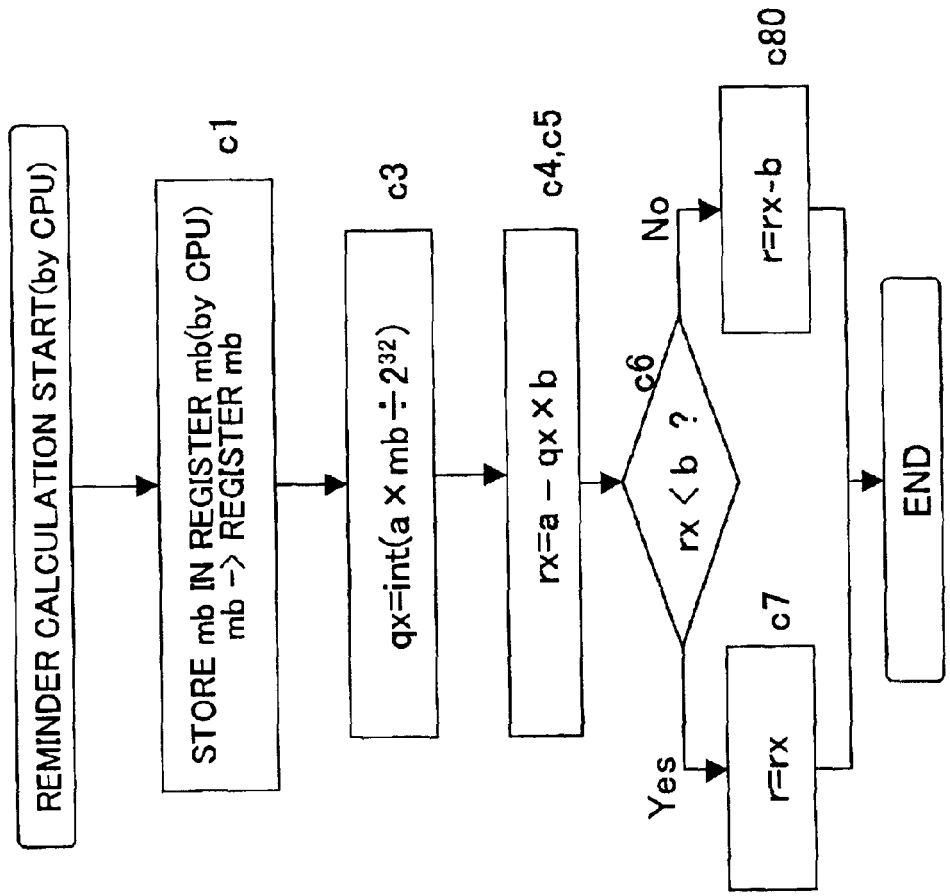
FIG. 8 is a flowchart of an assembly code for a remainder operation converted by a compiler of an aspect of the embodiment.
Figure 9:
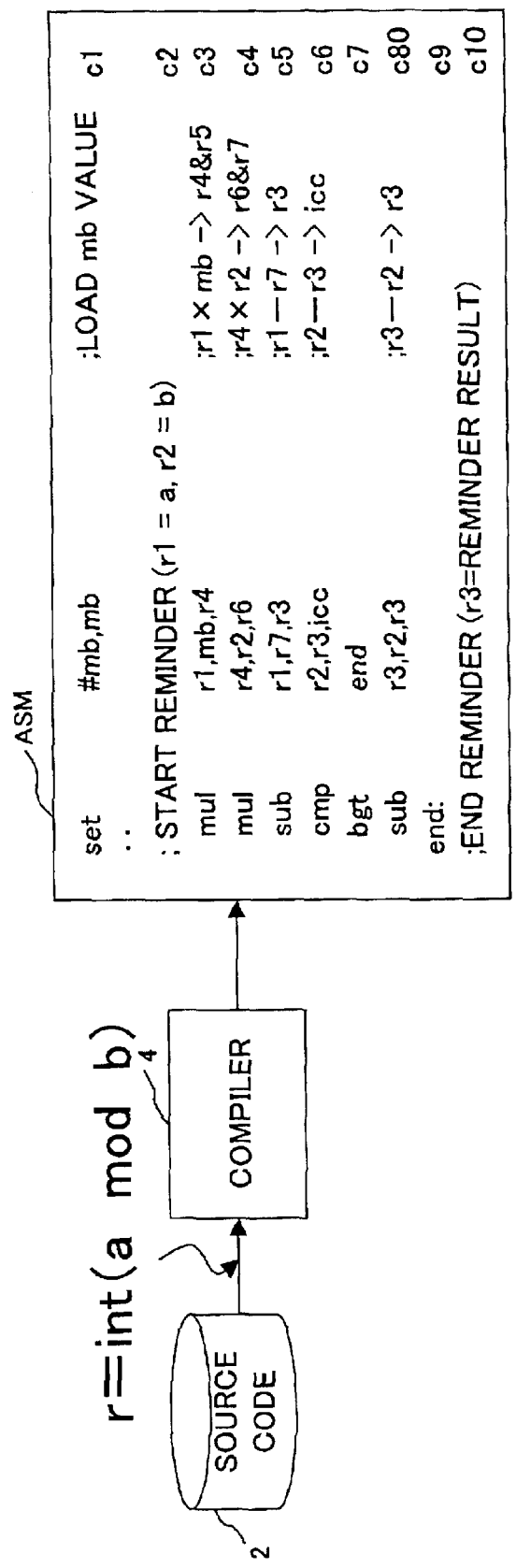
FIG. 9 is a diagram showing an example of an assembly code for a remainder operation converted by a compiler of an aspect of the embodiment.

FIG. 8 is a flowchart of remainder calculation assembly code converted by a compiler of this aspect of the embodiment. Furthermore, FIG. 9 is a diagram showing an example of remainder calculation assembly code converted by a compiler of this aspect of the embodiment. The code numbers c1–c80 of FIG. 8 and FIG. 9 correspond to one another.

When explained in accordance with FIG. 8, the compiler stores a computed mb value in register mb (c1), and also calculates qx=int(a×mb÷m) (c3), calculates rx=a−qx×b (c4, c5), makes a determination as to whether rx<b (c6), and if the decision is Yes, branches and makes r=rx (c7), and if No, operates on r=rx−b (c80). When compared to FIG. 5, Steps c1, c3, c4, c5 and c6 of FIG. 8 are the same as those of FIG. 5, and only Step c80 differs from FIG. 5.

In accordance therewith, the example of assembly code ASM of FIG. 9 is the same as the integer division assembly code ASM of FIG. 3 from code c1–c7, and only the final subtraction instruction code c80 is different. That is, subtraction instruction code c80 constitutes an instruction code for subtracting b in general-purpose register r2 from rx in general-purpose register r3 and storing that result in general-purpose register r3. Thus, a remainder operation result is stored inside general-purpose register r3. Division instructions are not included in the assembly code ASM of FIG. 9 either, and microprocessor execution from code c2 to c80 is completed in a total of eight cycles.

Figure 10:
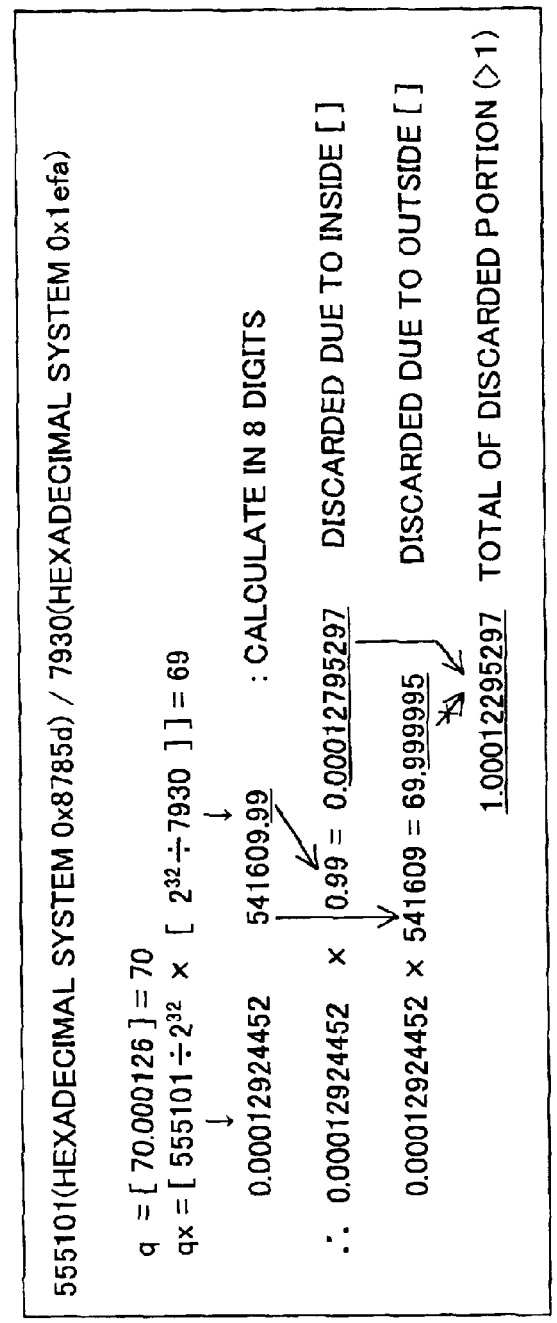
FIG. 10 is a diagram showing an example of an integer division and integer remainder operation that result in q=qx+1.

FIG. 10 is a diagram showing an example of when q=qx+1 in an integer division and integer remainder calculation. In the example shown in FIG. 10, a=555101 and b=7930, and, in this case, becomes $$q=\text{int}(555101 \div 7930)=70$$

$$qx=\text{int}(555101 \div 2^{32} \times \text{int}(2^{23} \div 7930))=69$$

and constitutes q=qx+1. As shown in the figure, due to the error inside the [ ], which indicate int, the qx discard error exceeds 1, resulting in q=qx+1.

In the above aspects of the embodiment, integer division and integer remainder calculations of unsigned integers a and b were explained, but even for signed integer division and signed integer remainder calculations of signed integers a and b, a compiler can generate assembly code such that, when a<0 and b<0, after making these positive, the above-described unsigned integer division and unsigned integer remainder calculation is performed, and at the end, the sign of the quotient or remainder is returned to its original state.

That is, in the case of signed integer division q=int(a÷b) for signed integers a and b, which can be expressed in N bits, this calculation can be converted to the assembly code of FIG. 3 as:

$$q=\text{int}(-a \div -b)(a<0, b<0) \quad (10)$$

$$q=-\text{int}(a \div -b)(a>=0, b<0) \quad (11)$$

$$q=-\text{int}(-a \div b)(a<0, b>=0) \quad (12)$$

$$q=\text{int}(a \div b)(a>=0, b>=0) \quad (13)$$

FIG. 11 shows an example of assembly code for a signed integer division converted by a compiler of this aspect of the embodiment when b<0 in the above-mentioned (10) and (11). When the compiler detects a signed integer division inside a source code, it can detect from the sign bit whether the divisor b is positive or negative. Therefore, since b<0 has been made clear beforehand, a determination is made as to whether or not a>=0 (codes c20, c21), and if a>=0 is false (No branch for code c 21), codes c3–c8 shown in 40 in the figure are executed, and processing branches to label End (code c23), and if a>=0 is true (Yes branch for code c21), codes c3–c8 shown in 42 in the figure below label L1 are executed, and thereafter, a minus sign is appended to the result of division in general-purpose register r4 (code c24), and signed division is terminated.

That is, instruction codes c3–c8 listed in 42 in the figure are the same as codes c3–c8 in FIG. 3. Meanwhile, instruction codes c3–c8 listed in 40 for a<0 are codes for performing the same instructions using −a, which is stored in general-purpose register r8 by code c20. As indicated by the underlines in the figure, the instruction codes of 42 shown in the figure differ only in that they are stored in general-purpose register r8 instead of r1.

Therefore, if the assembly code of FIG. 11 is compared with that of the unsigned integer division of FIG. 3, either initial instruction codes c20, c21, and branching instruction c23 are added, or initial instruction codes c20, c21, and instruction c24 for adding a minus sign at the end are added. Therefore, compared to an unsigned integer division, a signed integer division adds only three cycles. That is, for the assembly code of FIG. 11, 8+3=11 cycles.

Furthermore, in the assembly code of FIG. 11, the assembler-determined mb value is described within the code c2 initialization block.

Even when divisor b is greater than or equal to zero (b 0), the same assembly code as that of FIG. 11 is generated. However, b is stored in general-purpose register r2 instead of −b. Everything else is the same.

In a signed integer remainder calculation, too, assembly code can be generated in the same manner as described hereinabove. That is, in the case of signed remainder calculation r=int(a mod b) for signed integers a and b that can be expressed in N bits, this calculation can be converted to the assembly code of FIG. 9 as:

$$r = \text{int}(-a \bmod -b)(a<0, b<0) \quad (14)$$

$$r = -\text{int}(a \bmod -b)(a>=0, b<0) \quad (15)$$

$$r = -\text{int}(-a \bmod b)(a<0, b>=0) \quad (16)$$

$$r = \text{int}(a \bmod b)(a>=0, b>=0) \quad (17)$$

It is simple for a person skilled in the art to develop the signed integer remainder calculation assembly code of the above-mentioned (14) and (15) by adding instruction codes C20, C21, C23 and C24 of FIG. 11. Therefore, detailed assembly code will be omitted.

Figure 12:
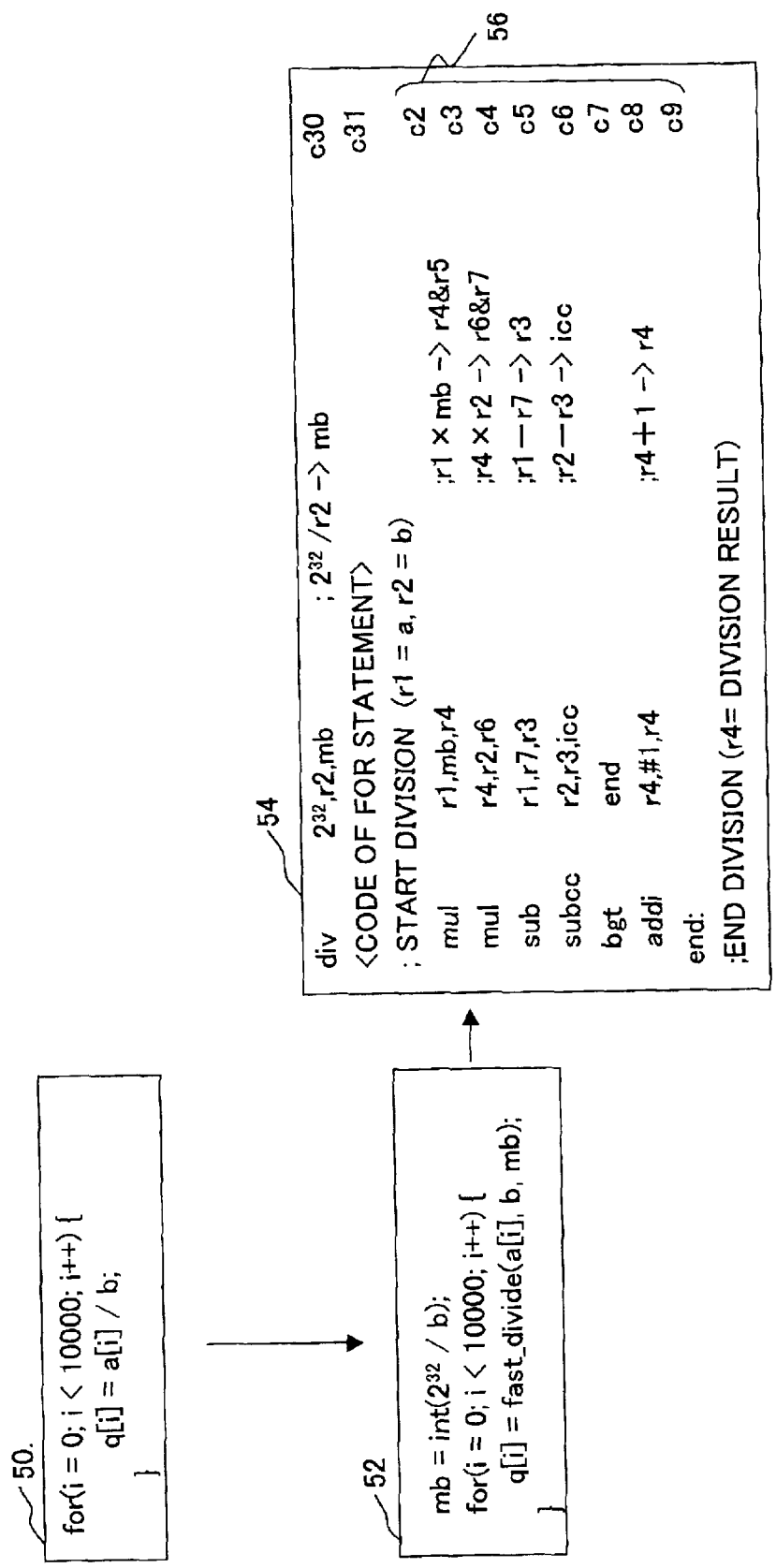
FIG. 12 is a diagram showing an example of a compiled integer division inside a loop.

FIG. 12 is a diagram showing an example of a compiled integer division inside a loop. There are cases, such as a for statement of the C language, in which the same division calculations are carried out repeatedly in a source program. For example, source code 50 of FIG. 12 is one such example. In this source code 50, the integer division of q[i]=a[i]/b in which argument i is from 0 to 10000 is repeated according to a for statement. In this repetitive division, divisor b is constant within the loop, but in the source program, it is a variable rather than a constant. Therefore, divisor b is a value that changes according to a program not shown in the figure until the for statement of source code 50 is executed. For this reason, when the compiler compiles the source code, this divisor b is not determined, and mb=m/b cannot be calculated when the compiler compiles the source code.

In a case such as this, the compiler of this aspect of the embodiment creates assembly code 54 so as to insert code for calculating mb=int($2^{32}$/b) one time before the for statement as in source code 52 of FIG. 12. The q[i]=fast divide (a[i], b, mb) inside the for statement of source code 52 means the integer division without division instructions shown in FIG. 3.

Assembly code 54 generated by the above-described compiler has division code c30 for calculating mb=int($2^{32}$/b) embedded inside the initialization block of the for statement, and, as shown in 56 in the figure, is converted to the same instruction codes c2–c9 as FIG. 3 for integer division q[i]=(a[i]/b) within the for statement. In other words, division code c30 is outside the loop statement, and the assembly code for integer division is embedded inside the loop statement.

Therefore, when assembly code 54 converted in this manner is executed in a microprocessor, a division calculation for divisor mb of constant m=$2^{32}$ and variable b is executed one time according to division code div prior to for statement execution, and thereafter, instruction codes c3–c9 are executed 10000 times. Division code is not contained in integer division inside the loop, which is executed 10000 times.

Thus, since a compiler cannot calculate mb during compiling when divisor b of integer division is a variable, it is necessary to embed division code for calculating this mb inside assembly code. However, when this integer division is inside a loop that is repeated a plurality of times, if division code for calculating mb is embedded outside the loop, it becomes possible to regard this division code as a small number of cycles for one integer division even when this division code requires a large number of cycles.

The above-described compiler example is not limited to integer division inside a loop, but rather can also be applied in the same way to an integer remainder calculation inside a loop. In this case, codes c2–c9 inside assembly code 54 of FIG. 12 are replaced with codes c2–c9 of FIG. 9. In other words, division code for calculating mb=$2^{32}$/b is embedded inside the initial block of the for statement, and codes c2–c9 of FIG. 9 are embedded inside the for statement.

In the above-described aspect of the embodiment, the explanation focused on a system at the development stage of a microprocessor. In a development system like this, ordinarily a compiler is executed by a general-purpose computer not shown in the figures, and the compiler converts a source program to assembly code and stores the assembly code inside instruction code memory. Then, this converted assembly code is executed by the microprocessor being developed (ordinarily a microprocessor for evaluation use), and an evaluation is made as to whether or not a desired function can be realized.

Then, following the completion of evaluation, a microprocessor, which has internal memory for storing assembly code as source code and arithmetic circuits for executing this code, is produced in volume. Or, upon completion of evaluation, a system comprising a microprocessor, which has external memory for storing assembly code as source code and arithmetic circuits for executing this code, is produced in volume.

However, the present invention is not limited to the above-described development system, and can also be applied to a general-purpose computer system comprising a compiler and microprocessor. In this case, a source program, such as an application program, is executed by the general-purpose computer, and during the execution thereof, a compiler converts integer division and integer remainder calculations inside a source program to an object code, which does not comprise division instruction code, and this object code is executed by a microprocessor. Therefore, the execute cycle can be shortened.

According to the present invention described hereinabove, because a compiler can convert integer division or an integer remainder calculation to an object code, which does not comprise division instructions, it is possible to greatly reduce the execute cycles of a microprocessor, which executes this object code.

What is claimed is:

1. A system for executing an object code converted from a source program having an integer division, said system comprising:

a compiler having program code, which, for a source program including an integer division calculation q=int(a−b)(int( ) being a function which discards figures below decimal point in parentheses) for dividing integer a, which is expressed in N bits, by integer constant b, causes a computer to execute a first process for calculating mb=int(m÷b) (where m=$2^N$), and a second process for generating an object code, which stores the mb in a first register, calculates qx=int(a×mb÷m), calculates rx=a−qx×b, set a quotient q to q=qx when rx<b, and set the quotient q to q=qx+1 when rx>=b; and a microprocessor having an arithmetic circuit, which comprises said first register, a multiplier, and an adder-subtractor, and which executes the object code generated by the compiler.

2. The system according to the claim 1, wherein the object code for calculating qx=int(a×mb÷m) in said second process of the compiler is to make, when the product value of a×mb is stored by double precision in a higher rank register and lower rank register, the value registered in the higher rank register qx.

3. The system according to the claim 1, wherein the integers a and b are signed integers, and, in said second process of the compiler, when both said integers a and b are negative, an object code for converting the signs of both a and b to positive is further generated, and when one of said integers a and b is negative, an object code for converting the negative sign of the integers to positive, and for adding a negative sign to a division result is further generated.

4. The microprocessor evaluation system according to the claim 1, wherein said microprocessor is an evaluation microprocessor.

5. A system for executing an object code converted from a source program having an integer division, said system comprising:

a compiler having a program code, which, for a source program including an integer division calculation q=int(a÷b)(int( ) being a function which discards figures below decimal point in parentheses) for dividing integer a, which is expressed in N bits, by integer constant b inside a repetitive loop statement, causes a computer to execute a first process, for generating, outside of said loop statement, an object code which calculates mb=int(m÷b) (where m=$2^N$) and stores the mb in a first register, and a second process for generating an object code, which calculates qx=int(a×mb÷m), calculates rx=a÷qx×b, set a quotient q to q=qx when rx<b, and set the quotient q to q=qx+1 when rx>=b; and a microprocessor having an arithmetic circuit, which comprises said first register, a multiplier, an adder-subtractor and a divider, and which executes the object code generated by the compiler.

6. The system according to the claim 5, wherein the object code for calculating qx=int(a×mb÷m) in said second process of the compiler is to make, when the product value of a×mb is stored by double precision in a higher rank register and lower rank register, the value registered in the higher rank register qx.

7. The system according to the claim 5, wherein the integers a and b are signed integers, and, in said second process of the compiler, when both said integers a and b are negative, an object code for converting the signs of both a and b to positive is further generated, and when one of said integers a and b is negative, an object code for converting the negative sign of the integers to positive, and for adding a negative sign to a division result is further generated.

8. The microprocessor evaluation system according to the claim 5, wherein said microprocessor is an evaluation microprocessor.

9. A system for executing an object code converted from a source program having an integer remainder calculation, said system comprising:

a compiler having program code, which, for a source program including an integer remainder calculation q=int(a mod b)(int( ) being a function which discards figures below decimal point in parentheses) for determining a reminder when integer a, which is expressed in N bits, is divided by integer constant b, causes a computer to execute a first process for calculating mb=int(m÷b) (where m=$2^N$), and a second process for generating an object code, which stores the mb in a first register, calculates qx=int(a×mb÷m), calculates rx=a−qx×b, set a remainder r to r=rx when rx<b, and set the remainder r to r=rx−b when rx>=b; and a microprocessor having an arithmetic circuit, which comprises said first register, a multiplier, and an adder-subtractor, and which executes the object code generated by the compiler.

10. The system according to the claim 9, wherein the object code for calculating qx=int(a×mb÷m) in said second process of the compiler is to make, when the product value of a×mb is stored by double precision in a higher rank register and a lower rank register, the value registered in the higher rank register qx.

11. The system according to the claim 9, wherein the integers a and b are signed integers, and, in said second process of the compiler, when both said integers a and b are negative, an object code for converting the signs of both a and b to positive is further generated, and when one of said integers a and b is negative, an object code for converting the negative sign of the integers to positive, and for adding a negative sign to a remainder calculation result is further generated.

12. The microprocessor evaluation system according to the claim 9, wherein said microprocessor is an evaluation microprocessor.

13. A system for executing an object code converted from a source program having an integer remainder operation, said system having:

a compiler having program code, which, for a source program including an integer remainder calculation q=int(a mod b)(int( ) being a function which discards figures below decimal point in parentheses) for determining a reminder when integer a, which is expressed in N bits, is divided by integer constant b inside a repetitive loop statement, causes a computer to execute a first process, for generating, outside of said loop statement, an object code which calculates mb=int(m÷b) (where m=$2^N$) and stores the mb in a first register, and a second process for generating, inside said loop statement, an object code, which calculates qx=int(a×mb÷m), calculates rx=a−qx×b, set a remainder r to r=rx when rx<b, and set the remainder r to r=rx−b when rx>=b; and a microprocessor having an arithmetic circuit, which comprises said first register, a multiplier, an adder-subtractor and a divider, and which executes the object code generated by the compiler.

14. The system according to the claim 13, wherein the object code for calculating qx=int(a×mb÷m) in said second process of the compiler is to make, when the product value of a×mb is stored by double precision in a higher rank register and a lower rank register, the value registered in the higher rank register qx.

15. The system according to the claim 13, wherein the integers a and b are signed integers, and, in said second process of the compiler, when both said integers a and b are negative, an object code for converting the signs of both a and b to positive is further generated, and when one of said integers a and b is negative, an object code for converting the negative sign of the integers to positive, and for adding a negative sign to a remainder calculation result is further generated.

16. The microprocessor evaluation system according to the claim 13, wherein said microprocessor is an evaluation microprocessor.

17. A compiler for converting a source program having an integer division to a microprocessor-executable object code, said compiler having a program code, which, for a source program including an integer division calculation q=int(a÷b) (int( ) being a function which discards figures below decimal point in parentheses) for dividing integer a, which is expressed in N bits, by integer constant b, causes a computer to execute:

a first process for calculating mb=int(m÷b) (where m=$2^N$); and a second process for generating an object code, which stores the mb in a first register inside said microprocessor, calculates qx=int(a×mb÷m), calculates rx=a−qx×b, set a quotient q to q=qx when rx<b, and set the quotient q to q=qx+1 when rx>=b.

18. A compiler for converting a source program having an integer division to a microprocessor-executable object code, said compiler having a program code, which, for a source program including an integer division calculation q=int(a÷b) (int( ) being a function which discards figures below decimal point in parentheses) for dividing integer a, which is expressed in N bits, by integer constant b inside a repetitive loop statement, causes a computer to execute:

a first process, which generates, outside said loop statement, an object code for calculating mb=int(m÷b) (where m=$2^N$) and for storing the mb in a first register; and a second process, which generates, inside said loop statement, an object code for calculating qx=int(a× mb÷m), calculating rx=a−qx×b, setting a quotient q to q=qx when rx<b, and setting the quotient q to q=qx+1 when rx>=b.

19. A compiler for converting a source program having an integer remainder calculation to a microprocessor-executable object code, said compiler having a program code, which, for a source program including an integer remainder calculation q=int(a mod b)(int( ) being a function which discards figures below decimal point in parentheses) for determining a reminder when integer a, which is expressed in N bits, is divided by integer constant b, causes a computer to execute:

a first process for calculating mb=int(m÷b) (where m=$2^N$); and a second process for generating an object code, which stores the mb in a first register, calculates qx=int(a× mb÷m), calculates rx=a−qx×b, set a remainder r to r=rx when rx<b, and set the remainder r to r=rx−b when rx>=b.

20. A compiler for converting a source program having an integer remainder calculation to a microprocessor-executable object code, said compiler having a program code, which, for a source program including an integer remainder calculation q=int(a mod b)(int( ) being a function which discards figures below decimal point in parentheses) for determining a reminder when integer a, which is expressed in N bits, is divided by integer constant b inside a repetitive loop statement, causes a computer to execute:

a first process, which generates, outside said loop statement, an object code for calculating mb=int(m÷b) (where m=$2^N$) and for storing the mb in a first register; and a second process, which generates, inside said loop statement, an object code for calculating qx=int(a× mb÷m), calculating rx=a−qx×b, setting a remainder r to r=rx when rx<b, and setting the remainder r to r=rx−b when rx>=b.

21. A microprocessor for executing an object code converted by a compiler from a source program having integer division, said microprocessor comprising:

a memory which, for a source program including an integer division calculation q=int(a÷b)(int( ) being a function which discards figures below decimal point in parentheses) for dividing integer a, which is expressed in N bits, by integer constant b, stores an object code for causing a computer to store mb=int(m÷b) (where m=$2^N$) in a first register, calculate qx=int(a×mb÷m), calculate rx=a−qx×b, set a quotient q to q=qx when rx<b, and set the quotient q to q=qx+1 when rx>=b; and an arithmetic circuit, which comprises said first register, a multiplier, and an adder-subtractor, and which executes said object code inside said memory.

22. A microprocessor for executing an object code converted by a compiler from a source program having an integer division, said microprocessor comprising:

a memory which stores, for a source program including an integer division calculation q=int(a÷b)(int( ) being a function which discards figures below decimal point in parentheses) for dividing integer a, which is expressed in N bits, by integer constant b inside a repetitive loop statement, an object code which is embedded outside said loop statement, causes a computer to calculate mb=int(m÷b) (where m=$2^N$), and store the mb in a first register, and an object code, which is embedded inside said loop statement, and which causes a computer to calculate qx=int(a×mb÷m), calculate rx=a−qx×b, set a quotient q to q=qx when rx<b, and set the quotient q to q=qx+1 when rx>=b; and an arithmetic circuit, which comprises said first register, a multiplier, an adder-subtractor and a divider, and which executes said object codes inside said memory.

23. A microprocessor for executing an object code converted by a compiler from a source program having an integer remainder calculation, said microprocessor comprising:

a memory which stores, for a source program including an integer remainder calculation q=int(a mod b)(int( ) being a function which discards figures below decimal point in parentheses) for determining a reminder when integer a, which is expressed in N bits, is divided by integer constant b, an object code for causing a computer to store mb=int(m÷b) (where m=$2^N$) in a first register, calculate qx=int(a×mb÷m), calculate rx=a− qx×b, set a remainder r to r=rx when rx<b, and set the remainder r to r=rx−b when rx>=b; and an arithmetic circuit, which comprises said first register, a multiplier, and an adder-subtractor, and which executes said object code inside said memory.

24. A microprocessor for executing an object code converted by a compiler from a source program having an integer remainder calculation, said microprocessor comprising:

a memory which stores, for a source program including an integer remainder calculation q=int(a mod b)(int( )

being a function which discards figures below decimal point in parentheses) for determining a reminder when integer a, which is expressed in N bits, is divided by integer constant b inside a repetitive loop statement, an object code which is embedded outside said loop statement, causes a computer to calculate mb=int(m÷b) (where m=$2^N$), and store the mb in a first register, and an object code which is embedded inside said loop statement, and which causes a computer to calculate qx=int(a×mb ÷m), calculate rx=a–qx×b, set a remainder r to r=rx when rx<b, and set the remainder r to r=rx–b when rx>=b; and an arithmetic circuit, which comprises said first register, a multiplier, an adder-subtractor and a divider, and which executes said object codes inside said memory.

25. A microprocessor system for executing an object code converted by a compiler from a source program having integer division, said microprocessor system comprising:

a memory which stores, for a source program including an integer division calculation q=int(a÷b)(int( ) being a function which discards figures below decimal point in parentheses) for dividing integer a, which is expressed in N bits, by integer constant b, an object code causing a computer to store mb=int(m÷b) (where m=$2^N$) in a first register, calculate qx=int(a×mb÷m), calculate rx=a–qx×b, set a quotient q to q=qx when rx<b, and set the quotient q to q=qx+1 when rx>=b; and a microprocessor having an arithmetic circuit which comprises said first register, a multiplier, and an adder-subtractor, and which executes said object code inside said memory.

26. A microprocessor system for executing an object code converted by a compiler from a source program having integer division, said microprocessor system comprising:

a memory which stores, for a source program including an integer division calculation q=int(a÷b)(int( ) being a function which discards figures below decimal point in parentheses) for dividing integer a, which is expressed in N bits, by integer constant b inside a repetitive loop statement, an object code which is embedded outside said loop statement, causes a computer to calculate mb=int(m÷b) (where m=$2^N$), and store the mb in a first register, and an object code which is embedded inside said loop statement, and which causes a computer to calculate qx=int(a×mb÷m), calculate rx=a–qx×b, set a quotient q to q=qx when rx<b, and sets the quotient q to q=qx+1 when rx>=b; and a microprocessor having an arithmetic circuit which comprises said first register, a multiplier, an adder-subtractor and a divider, and which executes said object codes inside said memory.

27. A microprocessor system for executing an object code converted by a compiler from a source program having an integer remainder calculation, said microprocessor system comprising:

a memory which stores, for a source program including an integer remainder calculation q=int(a mod b)(int( ) being a function which discards figures below decimal point in parentheses) for determining a reminder when integer a, which is expressed in N bits, is divided by integer constant b, an object code for causing a computer to store mb=int(m÷b) (where m=$2^N$) in a first register, calculate qx=int(a×mb÷m), calculate rx=a–qx×b, set a remainder r to r=rx when rx<b, and set the remainder r to r=rx–b when rx>=b; and a microprocessor having an arithmetic circuit which comprises said first register, a multiplier, and an adder-subtractor, and which executes said object code inside said memory.

28. A microprocessor system for executing an object code converted by a compiler from a source program having an integer remainder calculation, said microprocessor system having:

a memory which stores, for a source program including an integer remainder calculation q=int(a mod b)(int( ) being a function which discards figures below decimal point in parentheses) for determining a reminder when integer a, which is expressed in N bits, is divided by integer constant b inside a repetitive loop statement, an object code which is embedded outside said loop statement, causes a computer to calculate mb=int(m÷b) (where m=$2^N$), and store the mb in a first register, and an object code which is embedded inside said loop statement, and which causes a computer to calculate qx=int(a×mb÷m), calculate rx=a–qx×b, set a remainder r to r=rx when rx<b, and set the remainder r to r=rx–b when rx>=b; and a microprocessor having an arithmetic circuit, which comprises said first register, a multiplier, an adder-subtractor and a divider, and which executes said object codes inside said memory.

* * * * *

UNITED STATES PATENT AND TRADEMARK OFFICE
CERTIFICATE OF CORRECTION

PATENT NO. : 6,907,442 B2
DATED : June 14, 2005
INVENTOR(S) : Atsushi Ike

It is certified that error appears in the above-identified patent and that said Letters Patent is hereby corrected as shown below:

Column 13,
Line 3, change "(a-b)" to -- (a÷b) --.
Line 45, change "rx=a÷qxxb," to -- rx = a - qx x b, --.

Column 15,
Lines 19-20, change "(where m = $2^{N); and}$" to -- (where m = $2^N$); and --.
Line 23, after "qz=int", change "(axmb+m)" to -- (a x mb + m), --.

Column 16,
Line 7, change "rx=a-qx-b," to -- rx = a - qx x b, --.

Column 17,
Line 10, change "rx=a÷qxxb," to -- rx = a - qx x b, --.

Signed and Sealed this

Twenty-first Day of March, 2006

JON W. DUDAS
*Director of the United States Patent and Trademark Office*